(12) United States Patent
Xie

(10) Patent No.: US 11,599,654 B2
(45) Date of Patent: Mar. 7, 2023

(54) METHOD AND APPARATUS FOR AUTHORITY CONTROL, COMPUTER DEVICE AND STORAGE MEDIUM

(71) Applicants: ENVISION DIGITAL INTERNATIONAL PTE. LTD., Singapore (SG); SHANGHAI ENVISION DIGITAL CO., LTD., Shanghai (CN)

(72) Inventor: Yun Xie, Shanghai (CN)

(73) Assignees: ENVISION DIGITAL INTERNATIONAL PTE. LTD., Singapore (SG); SHANGHAI ENVISION DIGITAL CO., LTD., Shanghai (CN)

(*) Notice: Subject to any disclaimer, the term of this patent is extended or adjusted under 35 U.S.C. 154(b) by 0 days.

(21) Appl. No.: 17/791,374

(22) PCT Filed: Jan. 8, 2021

(86) PCT No.: PCT/SG2021/050016
§ 371 (c)(1),
(2) Date: Jul. 7, 2022

(87) PCT Pub. No.: WO2021/141543
PCT Pub. Date: Jul. 15, 2021

(65) Prior Publication Data
US 2023/0036357 A1 Feb. 2, 2023

(30) Foreign Application Priority Data
Jan. 9, 2020 (CN) .......................... 202010022017.2

(51) Int. Cl.
*G06F 21/62* (2013.01)

(52) U.S. Cl.
CPC .............................. *G06F 21/6209* (2013.01)

(58) Field of Classification Search
CPC .................................................. G06F 21/6209
See application file for complete search history.

(56) References Cited

U.S. PATENT DOCUMENTS 7,475,235 B1   1/2009  Bernardy et al.
8,898,769 B2*  11/2014 Chastain ............. G06F 21/6227
                                                   726/17

(Continued)

OTHER PUBLICATIONS

Substantive Examination Adverse Report (Section 30(1) / 30(2)) (3 pages) dated Sep. 27, 2022 out of corresponding Malaysian Patent Application PI2022003647.

(Continued)

*Primary Examiner* — Vance M Little
(74) *Attorney, Agent, or Firm* — John C. Freeman; Crowell & Moring LLP

(57) ABSTRACT

A method and an apparatus for authority control, a computer device, and a storage medium, and relates to the field of the Internet technologies. The method includes: acquiring a configuration file according to a business scenario when a container is initialized, wherein the configuration file is managed outside the container; validating the configuration file in the container; receiving a user instruction; and identifying a type of the user instruction when the user instruction is an executable instruction. The method further including acquiring script content of a script file when the type of the user instruction indicates that the user instruction is the script file, wherein the script content includes at least one command statement; and performing a validity check on the at least one command statement based on the configuration file.

10 Claims, 7 Drawing Sheets

(56) References Cited

U.S. PATENT DOCUMENTS

| | | | |
|---|---|---|---|
| 10,515,005 B1* | 12/2019 | Burrell | G06F 11/368 |
| 2002/0129345 A1 | 9/2002 | Tilden et al. | |
| 2006/0048227 A1* | 3/2006 | Ohta | G06F 21/554 |
| | | | 726/25 |
| 2012/0131682 A1* | 5/2012 | Kim | G06F 21/10 |
| | | | 726/28 |
| 2012/0140771 A1* | 6/2012 | Liu | H04N 21/658 |
| | | | 370/390 |
| 2013/0340027 A1* | 12/2013 | Knudson | H04L 41/0806 |
| | | | 726/1 |
| 2016/0134596 A1 | 5/2016 | Kovacs et al. | |
| 2017/0109536 A1* | 4/2017 | Stopel | G06F 21/577 |
| 2018/0247064 A1 | 8/2018 | Aronovich et al. | |
| 2021/0142186 A1* | 5/2021 | Zhao | G06N 20/00 |

OTHER PUBLICATIONS

International Search Report dated Apr. 21, 2021 from PCT Priority Application PCT/SG2021/050016 (3 English pages).
Written Opinion dated Apr. 21, 2021 from PCT Priority Application PCT/SG2021/050016 (4 English pages).
International Preliminary Report on Patentability dated Dec. 1, 2021 from PCT Priority Application PCT/SG2021/050016 (20 pages).
Office Action dated Dec. 25, 2022 (Five pages including English translation) out of corresponding Korean Application 10-2022-7027024.

* cited by examiner

METHOD AND APPARATUS FOR AUTHORITY CONTROL, COMPUTER DEVICE AND STORAGE MEDIUM

This application is a national application based on Patent Cooperation Treaty Patent Application No. PCT/SG2021/050016, filed on Jan. 8, 2021, the entire contents of which are incorporated herein by reference.

This application claims under 35 U.S.C. § 119(a) the benefit of the filing date of Chinese Patent Application No. 202010022017.2, filed on Jan. 9, 2020, the entire contents of which are incorporated herein by reference.

BACKGROUND OF THE INVENTION

Field of Invention

TECHNICAL FIELD

The present disclosure relates to the field of the Internet technologies, and in particular to a method and an apparatus for authority control, a computer device and a storage medium.

DESCRIPTION OF RELATED ART

During the software development phase, developers need to perform continuous integration (CI) on the project. In order to guarantee the cleanliness and independence of a compilation environment, the container technology is generated. However, in the process of establishing a container, the user is usually endowed with a root authority, and running as the root in the container will bring some security risks to a host machine.

In related arts, in order to solve the above problem, the user is endowed with the reading and writing execution authorities of certain files in the container through chmod, or the authority control of a blacklist or whitelist is performed on the user by using an authority tool such as rbash, bash, lshell, and the like, thereby restricting the authority of the user in the container and ensuring the security of the host machine.

However, in the methods for authority control used in the above related technical solutions, the authority restriction generated by the authority control tool will be closed when the user is confirmed as a whitelisted user, so as to execute the script input by the user, resulting in the inaccuracy and lower security of authority control.

SUMMARY

Embodiments of the present disclosure provide a method and an apparatus for authority control, a computer device, and a storage medium, which can reduce the waste on the checking resources in the checking process and can improve the efficiency of check. The technical solution is as follows:

In one aspect, a method for authority control is provided, wherein the method is executed by a computer device, the computer device is configured to load and execute a container, and the method includes:

acquiring a configuration file according to a business scenario when the container is initialized, wherein the configuration file is managed outside the container, and the configuration file is configured with an authority control rule corresponding to the business scenario in the container;

validating the configuration file in the container;

receiving a user instruction;

identifying a type of the user instruction when the user instruction is an executable instruction;

acquiring script content of a script file when the type of the user instruction indicates that the user instruction is the script file, wherein the script content includes at least one command statement; and performing a validity check on the at least one command statement based on the configuration file.

In one aspect, an apparatus for authority control is provided. The apparatus is applied to a computer device, the computer device is configured to load and execute a container, and the apparatus includes:

a first acquiring module, configured to acquire a configuration file according to a business scenario when the container is initialized, wherein the configuration file is managed outside the container, and the configuration file is configured with an authority control rule corresponding to the business scenario in the container;

a validating module, configured to validate the configuration file in the container;

a receiving module, configured to receive a user instruction;

an identifying module, configured to identify a type of the user instruction when the user instruction is an executable instruction;

a second acquiring module, configured to acquire script content of a script file when the type of the user instruction indicates that the user instruction is the script file, wherein the script content includes at least one command statement; and a first checking module, configured to perform a validity check on the at least one command statement based on the configuration file.

Optionally, the apparatus further includes:

a first parsing module, configured to perform statement parsing on the script content to acquire statement content of the at least one command statement in the script content before performing the validity check on the at least one command statement based on the configuration file; and the first checking module, configured to sequentially perform the validity check on the statement content of the at least one command statement in an order of at least one command statement based on the corresponding configuration file.

Optionally, the apparatus further includes:

a first executing module, configured to execute a first command statement corresponding to first statement content when the first statement content in the statement content is valid; and an execution stopping module, configured to stop executing the command statement when second statement content in the statement content is invalid, and to quit the step of sequentially performing the validity check on the statement content of the at least one command statement in the order of the at least one command statement based on the corresponding configuration file.

Optionally, the apparatus further includes:

a second executing module, configured to execute the script content when the statement content of the at least one command statement is all valid.

Optionally, the apparatus further includes:

a second parsing module, configured to parse the command statement when the user instruction is the command statement, to acquire statement content of the command statement, a second checking module, configured to perform the validity check on the statement content of the command statement based on content of the configuration file corresponding to the statement content; and a third executing module, configured to execute the command statement when the statement content is valid.

Optionally, the authority control rule corresponding to the configuration file is configured by an Ishell tool according to the business scenario.

In one aspect, a computer device is provided. The computer device includes a processor and a memory storing at least one instruction, at least one program, a code set or an instruction set therein, wherein the at least one instruction, the at least one program, the code set or the instruction set, when loaded and executed by the processor, causes the processor to implement the above method for authority control.

In one aspect, a computer-readable storage medium is provided. The computer-readable storage medium stores at least one instruction, at least one program, a code set or an instruction set therein, wherein the at least one instruction, the at least one program, the code set or the instruction set, when loaded and executed by a processor, causes the processor to implement the above method for authority control.

The technical solutions provided by the present disclosure may include the following beneficial effects.

The configuration file is acquired from the outside of the container according to the business scenario when the container is initialized, and the configuration file is validated in the container. The user instruction is received, and when the user instruction is an executable instruction, the type of the user instruction is identified. When the type of the user instruction is a script file, at least one command statement contained in the script file is acquired, and a validity check is performed on the at least one command statement in the script file based on the configuration file. Therefore, during the use of the container, the user authorities in the container are controlled according to the business scenario, and the user authorities are controlled from the aspect of a smaller granularity, thereby improving the use security of the container while achieving the adjustability of the authorities.

It should be understood that the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Figure 1:
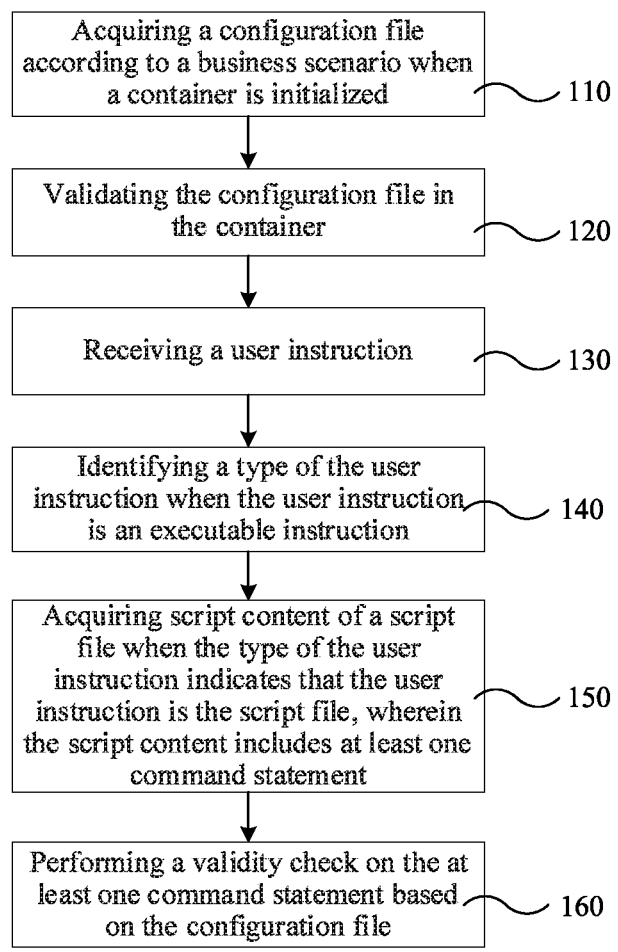
FIG. 1 shows a flowchart of a method for authority control provided by an exemplary embodiment of the present disclosure.

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present disclosure. Rather, they are merely examples of apparatuses and methods consistent with certain aspects of the present disclosure as detailed in the appended claims.

It should be understood that the term "plurality" herein refers to two or more. "And/or" herein describes the associated relationship of the associated objects, indicating three kinds of relationship. For example, A and/or B, may refer to as: A exists alone, A and B exist concurrently, B exists alone. The character "/" generally indicates that the contextual objects are in an "or" relationship.

In the continuous integration (CI) process of the project during the software development phase, a container is configured to guarantee the cleanliness and independence of the compilation environment. The method for container authority control provided in the present disclosure can perform different restrictions on the user authorities for different business scenarios when using the container, thereby improving the use security of the container while achieving the adjustability of authority control. In order to facilitate understanding, some terms involved in the present disclosure will be explained as follows.

1) Container Technology

The container technology, also known as container virtualization technology, is a technology that can effectively divide the resources of a single operating system into isolated groups, so as to better balance the conflicting resource usage requirements between the isolated groups.

The container is an operation example created from mirroring, and may be started, initiated, stopped, and deleted. Each container is a platform which is isolated from one another and guarantees security. The container may manage the life cycles of objects, and the dependencies between the objects. A configuration file, usually an extensible markup language (XML) may be used. For example, the name of the object, how to generate the object (a prototype pattern or a singleton pattern), and which object after generation must be set to the properties of a certain object, etc., may be defined thereon. After the container is started, all objects may be accessed directly without writing any line of program code to generate the object, or to establish the dependencies between the objects.

2) Continuous Integration (CI)

CI refers to the means of continuously and automatically compiling and testing the project in the development phase to control the code quality. CI is a software development practice. Team development members often integrate their work, and usually each member integrates the work at least once a day, which means that a plurality of integrations may occur each day. Each integration is verified by automatic establishment (including compilation, release, and automatic testing). Therefore, the integration errors are found as soon as possible, and the product quality is guaranteed while the product can be quickly iterated.

3) Mirroring

Mirroring is a form of file storage and is a type of redundancy. The identical copy of the data of one disk on another disk is a mirroring. Many files may be made into a mirroring file. Common mirroring file formats include ISO (international standard disc file system format), BIN, IMG, TAO, DAO, CIF and FCD. For the convenience of downloading and using by the user, when the system is destroyed, the system may be restored in a short time through the mirroring file, and the mirroring file may be recorded directly to a disc.

4) Root root refers to a superuser that exists in UNIX systems, Linux systems, and Android, root is configured for the highest authority of the operating system and may perform any operation in the system, such as process management, user management, hardware management, and the like. Due to the higher authority, improper operations of using the root may damage the operating system. Therefore, the user must be careful when operating under the root.

In related technologies, traditional CI tools, for example Jenkins, cannot guarantee the cleanliness and independence of the compilation environment, and often cause the problem of unclean establishment packages or mirrorings due to the unclean environment, which seriously affects the development and testing of the product and the release progress.

For this purpose, the method for establishing a container is provided. The container can guarantee the platforms isolated from one another, so that the compilation environments do not affect one another. However, since the establishment of the container requires a higher authority, and the user who establishes the container is usually endowed with the root authority, the following problems are easily caused due to the too high root authority.

(1) The operations related to the configuration files that contain usernames and passwords are affected.

For example, the usernames and passwords refer to the usernames and passwords of internal tools such as nexus and npm of a company, and the authorities thereof are very high. If the container runs as the root, then the user may know the usernames and passwords of these tools, which will affect the security of the company.

(2) The operations related to mounted directories are affected.

The mounted directories are shared directories shared by all users. If the container runs as the root, the user may operate the shared file, and then the file security of other users cannot be guaranteed.

(3) The execution as the root in the container may operate the host machine.

The container runs on the host machine. There may be a plurality of containers on one host machine, which may also be understood as a plurality of services on the host machine. If the container runs as the root, then the user may operate the host machine, for example, may kill other containers, and so on, thereby causing serious consequences.

In related technologies, at the level of the container, the user authorities inside the container are generally controlled by restricting login user authorities and hiding root users.

For different system users, the chomd tool is adopted to change the storage access mode of one or more files. The user authorities are controlled by endowing the users with the executing authorities for certain files, or by setting a whitelist and a blacklist via the authority control tools such as rbash (restricted bash), bdsh (boa diminish shell), and lshell (limited shell). However, when the above tools are found to be executed as the commands of executable scripts (shell/python), all the above technologies will close any restriction generated in the shell to execute the script.

For example, script A is an executable script and contains 4 commands. One of the commands is originally not allowed to be executed in the restriction generated in the shell. However, there is a script judged to be an executable script by checking with script A, then the commands contained in the script will not be checked, and the restriction generated in the shell is closed to execute the script. Therefore, the commands that are originally not allowed to be executed are also executed, resulting in the problems of inaccuracy and lower security of authority control.

Restricting the user authorities or hiding the root users will also fail to satisfy some business scenarios that require higher authorities.

The method for authority control provided in the present disclosure can perform different restrictions on the user authorities for different business scenarios when using the container, thereby improving the use security of the container while achieving the adjustability of authority control. Referring to FIG. 1, FIG. 1 shows a flowchart of a method for authority control provided by an exemplary embodiment of the present disclosure. The method for authority control is executed by a computer device. The computer device is configured to load and execute a container. As shown in FIG. 1, the method for authority control may include the following steps.

In step 110, a configuration file is acquired according to a business scenario when a container is initialized, wherein the configuration file is managed outside the container, and the configuration file is configured with an authority control rule corresponding to the business scenario in the container.

Optionally, the configuration file may be managed on a distributed version control system (Git).

Figure 2:
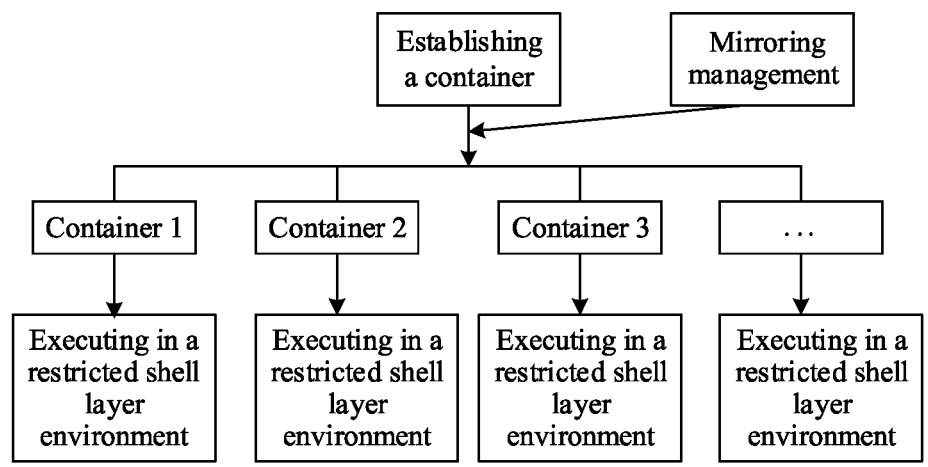
FIG. 2 shows a schematic diagram of a container established based on a mirroring involved in embodiments of the present disclosure.

Optionally, the container may be a container established based on a mirroring. Referring to FIG. 2. FIG. 2 shows a schematic diagram of a container established based on the mirroring involved in embodiments of the present disclosure. As shown in FIG. 2, a plurality of mirrorings may be stored in mirroring management, and mirroring content may also be updated according to the changes in business scenario requirements. When the container required for a certain business scenario needs to be established, the computer device acquires the mirroring corresponding to the business scenario from the mirroring management, and then establishes the container corresponding to the business scenario based on the mirroring. A plurality of containers may be established based on the same mirroring. The plurality of containers are independent and do not affect one another. Developers may configure different user authorities in the containers, such that the containers are executed in a limited shell layer environment, thereby achieving the purpose of flexibly setting the user authorities in the containers according to the business scenario.

The setting of the user authorities may be achieved by calling the configuration file managed outside the container. The configuration file is configured with the authority control rules corresponding to respective business scenarios. When the authority control rule corresponding to the business scenario needs to be changed, the developers only need to change the authority control rule in the configuration file, and do not need to reestablish the container.

Optionally, the configuration file may be configured with the authority control rules including, but not limited to, paths, commands, and environment variables.

In step 120, the configuration file is validated in the container.

The container writes the authority control rule in the corresponding configuration file acquired according to the business scenario into the container, to establish a shell environment with restricted user authorities, so that the container may perform authority control on the user using the container.

In step 130, a user instruction is received.

Optionally, the type of the user instruction may be a script file or a command statement.

In step 140, when the user instruction is an executable instruction, a type of the user instruction is identified.

At first, the container judges the executability of the user instruction based on the configuration file. The configuration file may be configured with restrictions related to executable instructions and instructions prohibited from being executed. According to the relevant content in the configuration file, whether the user instruction is executable is judged, and when the user instruction is an executable instruction, the type of the user instruction is identified.

In a possible case, the configuration file is configured with suffix names of the executable instructions and the suffix names of instructions prohibited from being executed. When the suffix name of the user instruction is a suffix name of the executable instructions in the configuration file, it is determined that the user instruction is an executable instruction, and the type of the user instruction is identified.

In step 150, when the type of the user instruction indicates that the user instruction is a script file, script content of the script file is acquired, and the script content includes at least one command statement.

The script is a program saved in plain text, and contains a command set such as bind and alias. The user may save such set as a separate file and then execute the same. During execution, the file commands in the script are translated into machine-identifiable instructions by an interpreter of the system and are executed based on the program.

In one possible case, the container may determine whether the user instruction is a script file by identifying the suffix name of the user instruction. When it is determined that the user instruction is the script file, the container reads at least one command statement contained in the script file to obtain the script content in the script file.

In step 160, a validity check is performed on the at least one command statement based on the configuration file.

The configuration file is configured with an authority control rule corresponding to the at least one command statement contained in the script file, and the validity check is performed on the command statement based on the authority control rule corresponding to the command statement in the script. For example, for the command statement indicating a path, the container judges whether the parameters in the command statement indicating the path are in the parameters specified by the authority control rule. When the parameters in the command statement indicating the path are in the parameters specified by the authority control rule, it is determined that the command statement indicating the path is valid. If the parameters in the command statement indicating the path are not in the parameters specified by the authority control rule, it is determined that the command statement indicating the path is invalid.

In summary, according to the method for authority control provided by the embodiment of the present disclosure, the configuration file is acquired from the outside of the container according to the business scenario when the container is initialized, and the configuration file is validated in the container. The user instruction is received, and when the user instruction is an executable instruction, the type of the user instruction is identified. When the type of the user instruction is a script file, at least one command statement contained in the script file is acquired, and a validity check is performed on the at least one command statement in the script file based on the configuration file. Therefore, during the use of the container, the user authorities in the container are controlled according to the business scenario, and the user authorities are controlled from the aspect of a smaller granularity, thereby improving the use security of the container while achieving the adjustability of the authorities.

Figure 3:
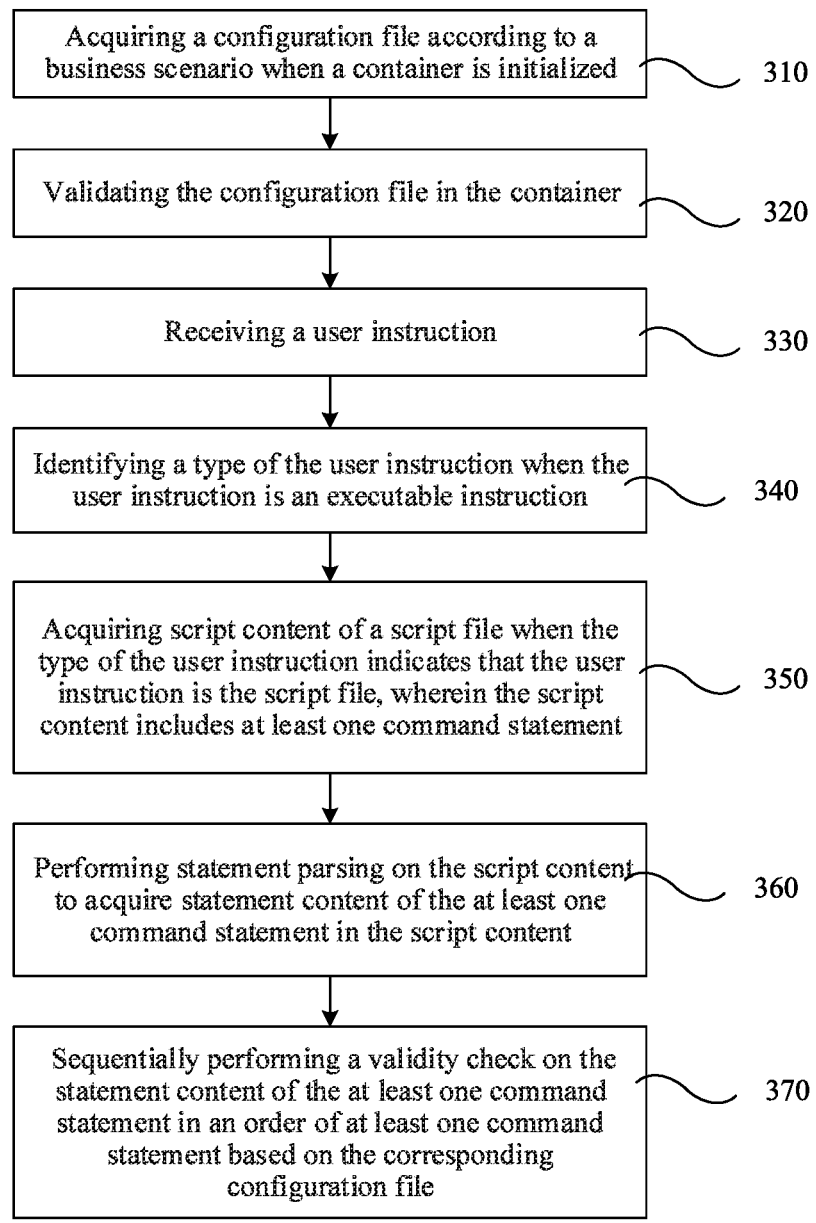
FIG. 3 shows a flowchart of a method for authority control provided by an exemplary embodiment of the present disclosure.

Referring to FIG. 3, FIG. 3 shows a flowchart of a method for authority control provided by an exemplary embodiment of the present disclosure. The method for authority control is executed by a computer device. The computer device is configured to load and execute a container. As shown in FIG. 3, the method for authority control may include the following steps.

In step 310, a configuration file is acquired according to the business scenario when a container is initialized, wherein the configuration file is managed outside the container, and the configuration file is configured with an authority control rule corresponding to the business scenario in the container.

Optionally, the authority control rule corresponding to the configuration file is configured by an Ishell tool according to the business scenario. The configurations of the configuration files corresponding to different business scenarios are different. The well-configured configuration files for respective business scenario are stored outside the container, so that when the user needs to adjust the control authority corresponding to the configuration file, the configuration file can be changed directly outside the container, thereby improving the flexibility of authority control.

In step 320, the configuration file is validated in the container.

In step 330, a user instruction is received.

In step 340, when the user instruction is an executable instruction, a type of the user instruction is identified.

In step 350, when the type of the user instruction indicates that the user instruction is a script file, script content of the script file is acquired, and the script content includes at least one command statement.

The execution manners of steps 310 to 350 may refer to the description of related content in the embodiment shown in FIG. 1, and details are not repeated herein again.

In step 360, statement parsing is performed on the script content to acquire statement content of the at least one command statement in the script content.

In step 370, a validity check is sequentially performed on the statement content of the at least one command statement in an order of at least one command statement based on the corresponding configuration file.

Optionally, when first statement content in the statement content is valid, a first command statement corresponding to the first statement content is executed.

When second statement content in the statement content is invalid, the execution of the command statement is stopped, and the step of sequentially performing the validity check on the statement content of the at least one command statement in the order of the at least one command statement based on the corresponding configuration file is quitted.

In a possible case, the container sequentially performs the check on the at least one command statement in the script file in an arrangement order of at least one command statement in the script file. When a checking result of the command statement indicates that the command statement is valid, the operation content indicated by the command statement is executed, and the validity check is performed on next command statement. For example, when command statement A indicates to view the current directory, after the command statement A is checked by the authority control rule corresponding thereto, and when it is judged that the command statement A is valid, the container executes the operation of viewing the current command. When the checking result of the command statement indicates that the command statement is invalid, the check on the command statement is stopped, and the check on other unchecked command statements contained in the script file to which such command statement belongs is quitted. That is to say, in the process of performing the validity check on the command statements contained in the script file in the arrangement order of the at least one command statement, if there is a valid command statement, the command statement is executed. When there is one of the command statements invalid, the validity of other unchecked command statements will not be checked, the check on the script file is directly quitted, and it is determined that the script file contains an invalid command statement.

Optionally, when the checking result of the container indicates that the script file contains an invalid command statement, the checking result is fed back to the user.

Or, optionally, when the statement content of the at least one command statement is all valid, the script content is executed.

In a possible case, the container sequentially performs the check on the at least one command statements in the script file in an arrangement order of at least one command statement in the script file. Only when the command statements contained in the script file are all valid, the operation of execution of the command statements in the script file is performed, that is, the validity check on the at least one command statement is performed in order. When it is determined that a command statement is valid, the validity check on the next command statement is performed till all the command statements in the script file are valid. In the above process, once one command statement is invalid, the validity check on the at least one command statement in the script file is quitted.

When the type of the user instruction indicates that the user instruction is the command statement, optionally, the command statement is parsed to acquire statement content of the command statement.

In other words, the user instruction is sent to the container in the form of command statement, wherein there may be one or more command statements, and the command statement carries the indication information of performing operations in the shown container.

The validity check is performed on the statement content of the command statement based on the content of the configuration file corresponding to the statement content of the command statement, that is, the validity check is performed on the statement content of the command based on the authority control rule corresponding to the command statement in the container.

When the checking result indicates that the statement content is valid, the command statement is executed.

In summary, according to the method for authority control provided by the embodiment of the present disclosure, the configuration file is acquired from the outside of the container according to the business scenario when the container is initialized, and the configuration file is validated in the container. The user instruction is received, and when the user instruction is an executable instruction, the type of the user instruction is identified. When the type of the user instruction is a script file, at least one command statement contained in the script file is acquired, and a validity check is performed on the at least one command statement in the script file based on the configuration file. Therefore, during the use of the container, the user authorities in the container are controlled according to the business scenario, and the user authorities are controlled from the aspect of a smaller granularity, thereby improving the use security of the container while achieving the adjustability of the authorities.

Figure 4:
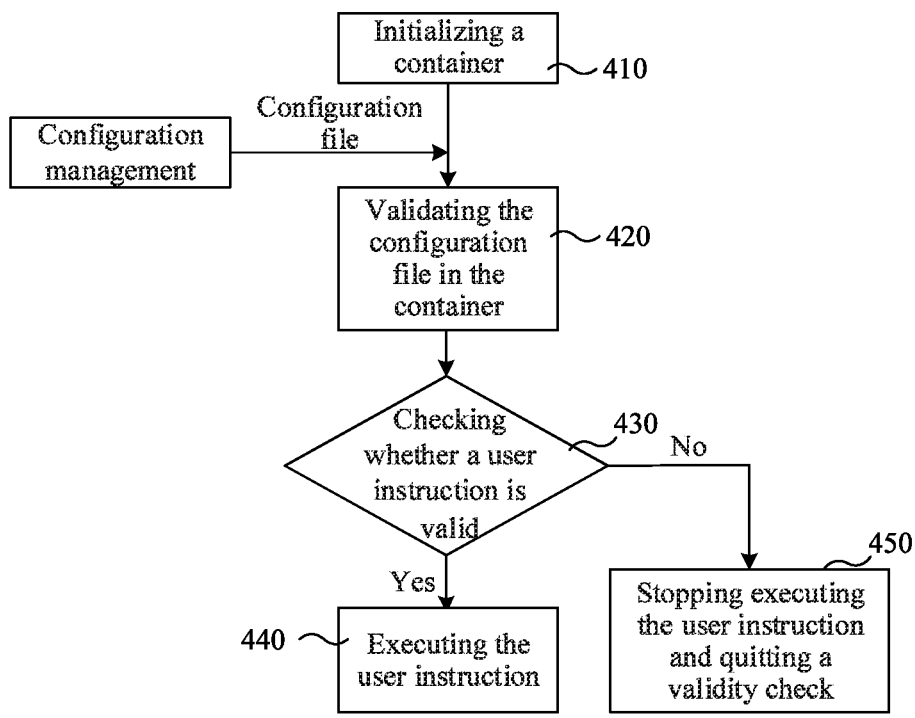
FIG. 4 shows a flowchart of a method for authority control provided by an exemplary embodiment of the present disclosure.

The following describes the present disclosure in combination with the fact that the user instruction is an executable script file. Referring to FIG. 4, FIG. 4 shows a flowchart of a method for authority control provided by an exemplary embodiment of the present disclosure. The method for authority control is executed by a computer device. The computer is configured to load and execute a container. As shown in FIG. 4, the method for authority control may include the following steps.

In step 410, a container is initialized, and a configuration file is acquired from configuration management according to current business scenario.

In step 420, the configuration file is validated in the container, so that a user is subjected to authority restriction in a container environment.

In step 430, whether a user instruction is valid is checked, if yes, step 440 is performed; otherwise, step 450 is performed.

In step 440, the user instruction is executed.

In step 450, execution of the user instruction is stopped and a validity check is quitted.

Figure 5:
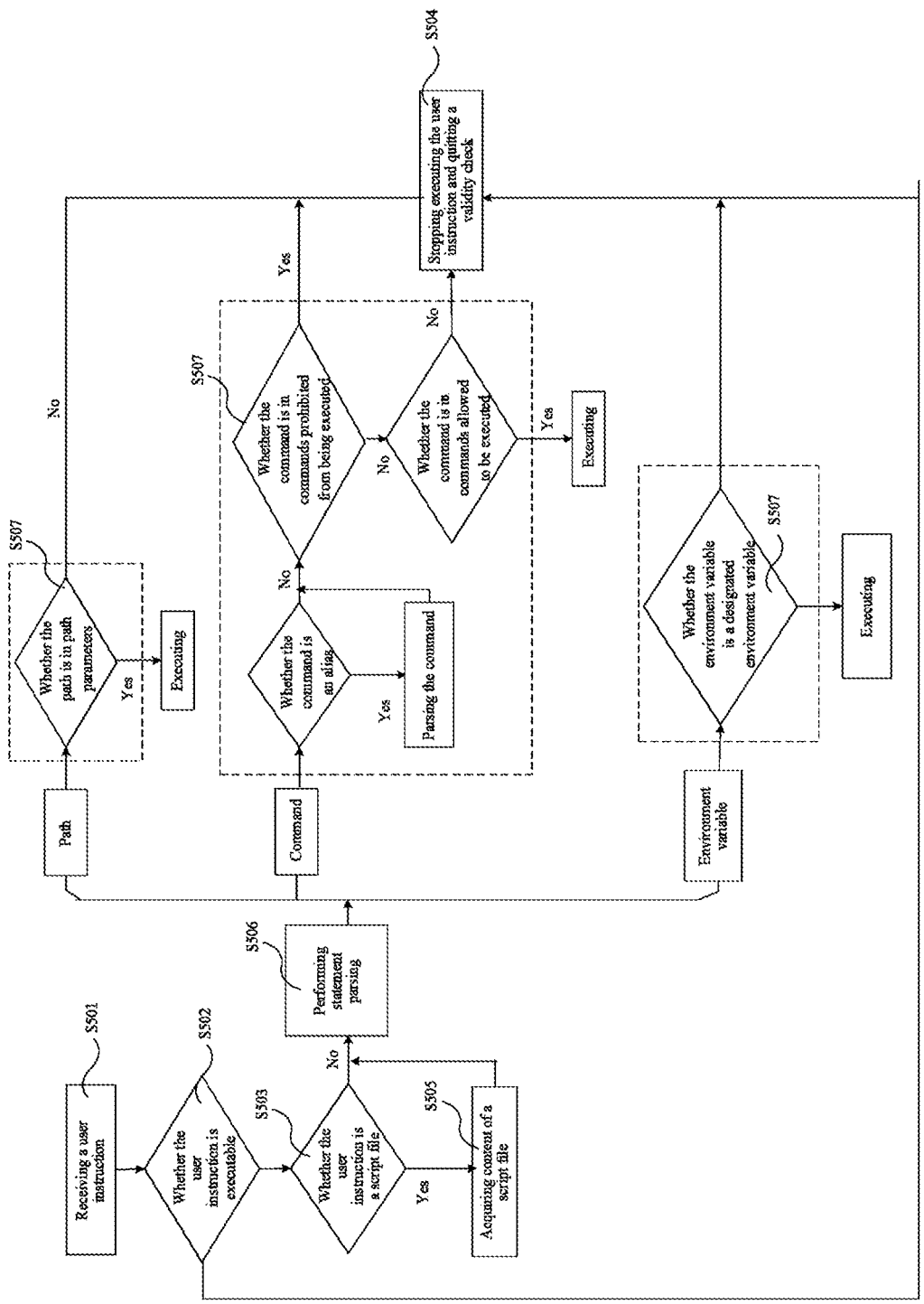
FIG. 5 shows a schematic diagram of a validity checking process for a user instruction involved in embodiments of the present disclosure.

The process from step 430 to step 450 may refer to FIG. 5, which shows a schematic diagram of a validity checking process for a user instruction involved in embodiments of the present disclosure. As shown in FIG. 5, the above process includes the following steps.

In S501, the container receives a user instruction.

In S502, whether the user instruction is executable is judged, if yes, S503 is performed; otherwise, S504 is performed.

In S503, whether the user instruction is a script file is judged, if yes, S505 is performed; otherwise, S506 is performed.

In the present embodiment, if the user instruction is not a script, the user instruction is considered to be a command statement.

In S504, execution of the user instruction is stopped and a validity check is quitted.

In S505, script content in the script file is acquired, wherein the script content contains at least one command statement.

In S506, statement parsing is performed on the command statement.

The parsing result is as shown in FIG. 5. By taking the script file containing three command statements as an example, the three command statements indicate paths, commands, and environment variables respectively.

In S507, a check on the command statement is performed. When the command statement passes the check, the command statement is executed. When the command statement fails the check, S504 is performed.

There are different check manners corresponding to instruction information of different command statements respectively.

For the command statement indicating a path, whether the parameters in the command statement indicating the path are in the parameters specified by the authority control rule may be judged. When the parameters in the command statement indicating the path are in the parameters specified by the authority control rule, it is determined that the command statement indicating the path passes the check and the command statement is executed. If the parameters in the command statement indicating the path are not in the parameters specified by the authority control rule, it is determined that the command statement indicating the path is invalid, the execution of the user instruction is stopped, and the validity check is quitted.

For the command statement indicating a command, whether the command statement is an alias may be judged at first. For example, for command cd, which is represented by "open" in the command statement input by the user, "open" is the alias of the command cd. When it is judged that there is an alias in the command statement, the command is parsed to obtain the command. Secondly, whether the command is in the commands that are prohibited from being executed of the authority restriction is judged. If yes, the check on the command statement is stopped and quitted. If not, whether the command is in the commands that are allowed to be executed of the authority restriction is judged. The commands that are allowed to be executed may be expressed as allowing to execute the commands in the authority restriction range, and may also be expressed as prohibiting the commands outside the authority restriction range from being executed. For example, the authority restriction indicates that command ABC in the container may be executed, then the command allowed to be executed may be allowing to execute the command ABC, or the command allowed to be executed may be prohibiting commands other than the command ABC from being executed. If the command is in the commands allowed to be executed, then the command is executed, otherwise the execution of the user instruction is stopped and the validity check is quitted.

For the command statement indicating an environment variable, whether the environment variable indicated by the command statement is in the environment variables restricted by the container authority is judged. When the environment variable indicated by the command statement is in the environment variables restricted by the container authority, the command statement is executed, otherwise the execution of the user instruction is stopped and the validity check is quitted.

In a possible case, the process of check the validity of the user instruction shown in FIG. 5 is also applicable to the case where the user instruction is a command statement. When the user instruction is the command statement, S505 does need to be performed. The statement parsing may be directly performed on the statement command to identify the content indicated by the command statement, thereby checking the validity of the command statement by using the authority corresponding to the content indicated by the command statement. If the command statement is valid, the command statement is executed; otherwise the execution of the user instruction is stopped and the validity check is quitted.

In summary, according to the method for authority control provided by the embodiment of the present disclosure, the configuration file is acquired from the outside of the container according to the business scenario when the container is initialized, and the configuration file is validated in the container. The user instruction is received, and when the user instruction is an executable instruction, the type of the user instruction is identified. When the type of the user instruction is a script file, at least one command statement contained in the script file is acquired, and a validity check is performed on the at least one command statement in the script file based on the configuration file. Therefore, during the use of the container, the user authorities in the container are controlled according to the business scenario, and the user authorities are controlled from the aspect of a smaller granularity, thereby improving the use security of the container while achieving the adjustability of the authorities.

Figure 6:
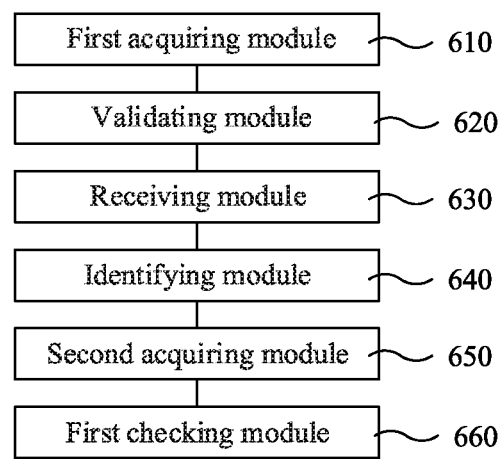
FIG. 6 shows a block diagram of an apparatus for authority control provided by an exemplary embodiment of the present disclosure.

Referring to FIG. 6, FIG. 6 shows a block diagram of an apparatus for authority control provided by an exemplary embodiment of the present disclosure. The apparatus may be implemented as all or part of a computer device in the form of software, to perform all or part of the steps of the methods shown in the corresponding embodiments of FIG. 1, FIG. 3, FIG. 4, or FIG. 5. As shown in FIG. 6, the apparatus for authority control may include:

a first acquiring module 610, configured to acquire a configuration file according to a business scenario when the container is initialized, wherein the configuration file is managed outside the container, and the configuration file is configured with an authority control rule corresponding to the business scenario in the container;

a validating module 620, configured to validate the configuration file in the container;

a receiving module 630, configured to receive a user instruction;

an identifying module 640, configured to identify a type of the user instruction when the user instruction is an executable instruction;

a second acquiring module 650, configured to acquire script content of a script file when the type of the user instruction indicates that the user instruction is the script file, wherein the script content includes at least one command statement; and a first checking module 660, configured to perform a validity check on the at least one command statement based on the configuration file.

Optionally, the apparatus further includes:

a first parsing module, configured to perform statement parsing on the script content to acquire statement content of the at least one command statement in the script content before performing the validity check on the at least one command statement based on the configuration file; and the first checking module, configured to sequentially perform the validity check on the statement content of the at least one command statement in an order of at least one command statements based on the corresponding configuration file.

Optionally, the apparatus further includes:

a first executing module, configured to execute a first command statement corresponding to first statement content when the first statement content in the statement content is valid; and an execution stopping module, configured to stop executing the command statement when second statement content in the statement content is invalid, and to quit the step of sequentially performing the validity check on the statement content of the at least one command statement in the order of the at least one command statement based on the corresponding configuration file.

Optionally, the apparatus further includes:

a second executing module, configured to execute the script content when the statement content of the at least one command statement is all valid.

Optionally, the apparatus further includes:

a second parsing module, configured to parse the command statement when the user instruction is the command statement, to acquire statement content of the command statement;

a second checking module, configured to perform the validity check on the statement content of the command statement based on content of the configuration file corresponding to the statement content; and a third executing module, configured to execute the command statement when the statement content is valid.

Optionally, the authority control rule corresponding to the configuration file is configured by an Ishell tool according to the business scenario.

In summary, when the apparatus for authority control provided by the embodiment of the present disclosure is applied to the computer device, the configuration file is acquired from the outside of the container according to the business scenario when the container is initialized, and the configuration file is validated in the container. The user instruction is received, and when the user instruction is an executable instruction, the type of the user instruction is identified. When the type of the user instruction is a script file, at least one command statement contained in the script file is acquired, and a validity check is performed on the at least one command statement in the script file based on the configuration file. Therefore, during the use of the container, the user authorities in the container are controlled according to the business scenario, and the user authorities are controlled from the aspect of a smaller granularity, thereby improving the use security of the container while achieving the adjustability of the authorities.

Figure 7:
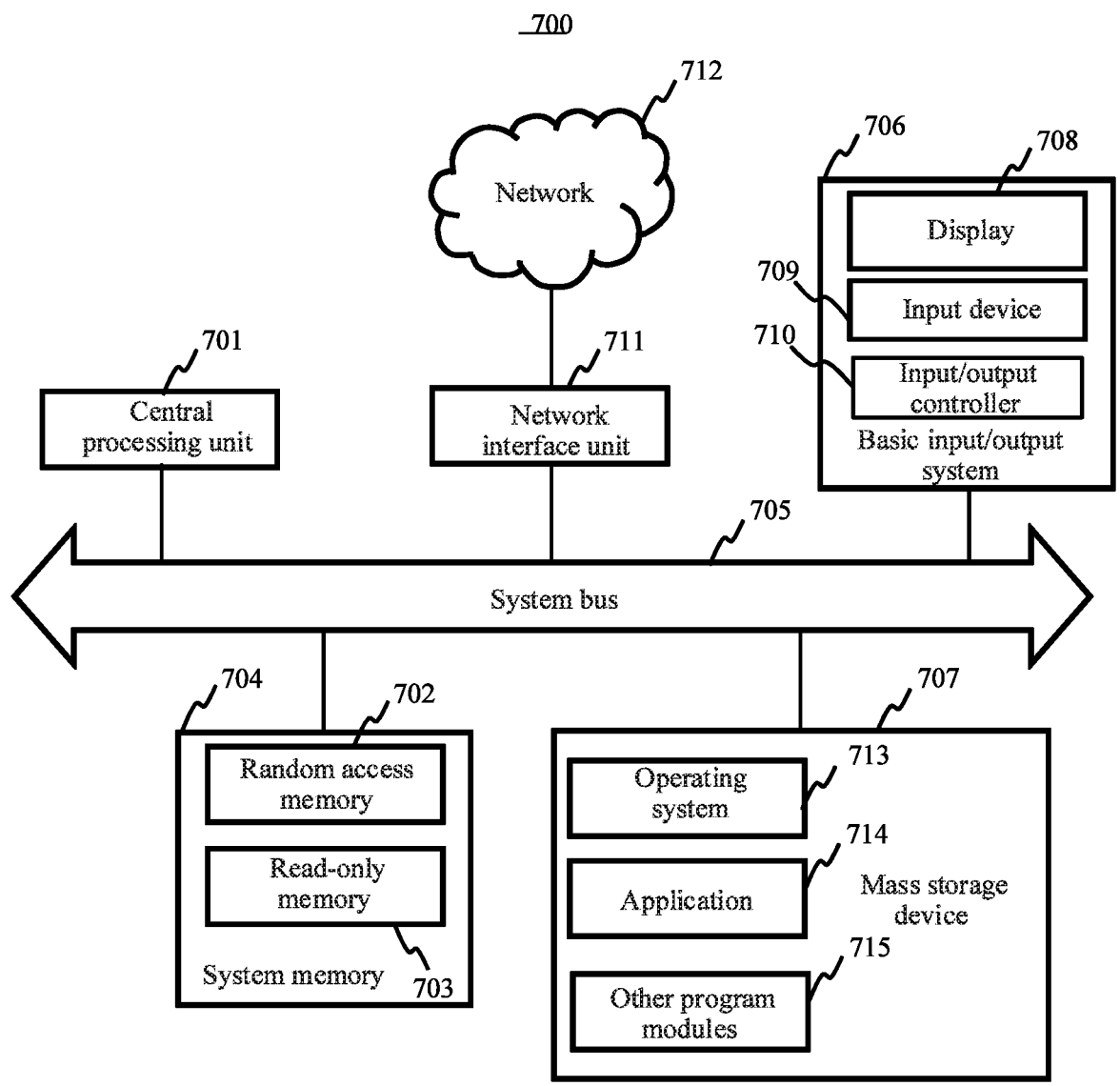
FIG. 7 is a structural block diagram of a computer device according to an exemplary embodiment.

FIG. 7 is a structural block diagram showing a computer device according to an exemplary embodiment. The computer device is configured to load and execute a container. The computer device 700 includes a central processing unit (CPU) 701, a system memory 704 including a random access memory (RAM) 702 and a read-only memory (ROM) 703, and a system bus 705 connecting the system memory 704 and the CPU 701. The computer device 700 further includes a basic input/output system (I/O system) 706 which helps information transmission among various components within a computer, and a mass storage device 707 for storing an operating system 713, an application 714 and other program modules 715.

The basic I/O system 706 includes a display 708 for displaying information and an input device 709, such as a mouse, a keyboard, and the like, for inputting information by a user. The display 708 and the input device 709 are both connected to the CPU 701 by an input/output controller 710 connected to the system bus 705. The basic I/O system 706 may also include the input/output controller 710 for receiving and processing input from a plurality of other devices, such as a keyboard, a mouse or an electronic stylus. Similarly, the input/output controller 710 further provides output to a display screen, a printer or other types of output devices.

The mass storage device 707 is connected to the CPU 701 by a mass storage controller (not shown) connected to the system bus 705. The mass storage device 707 and its associated computer-readable medium provide non-volatile storage for the computer device 700. That is, the mass storage device 707 may include a computer-readable medium (not shown), such as a hard disk or a compact disc read-only memory (CD-ROM) drive.

Without loss of generality, the computer-readable medium may include a computer storage medium and a communication medium. The computer storage medium includes volatile and non-volatile, removable and non-removable media implemented in any method or technology for storage of information such as a computer-readable instruction, a data structure, a program module or other data. The computer storage medium includes a RAM, a ROM, an erasable programmable read-only memory (EPROM), an electrically-erasable programmable read-only memory (EEPROM), a flash memory or other solid-state storage technologies; a CD-ROM, a digital versatile disc (DVD) or other optical storage; and a tape cassette, a magnetic tape, a magnetic disk storage or other magnetic storage devices. Of course, it will be known by a person skilled in the art that the computer storage medium is not limited to the above types. The above system memory 704 and the mass storage device 707 may be collectively referred to as the memory.

According to various embodiments of the present disclosure, the computer device 700 may also be operated by being connected through a network such as the Internet to a remote computer on the network. That is, the computer device 700 may be connected to the network 712 by a network interface unit 711 connected to the system bus 705, or that is, the computer device 700 may be connected to other types of networks or remote computer systems (not shown) by using the network interface unit 711.

The memory further includes one or more programs stored in the memory. The CPU 701 implements all or part of the steps of the methods shown in FIG. 1, FIG. 3, FIG. 4 or FIG. 5 by executing the one or more programs.

Those skilled in the art may appreciate that in one or more examples described above, the functions described in the embodiments of the present disclosure can be implemented in hardware, software, firmware, or any combination thereof. When implemented in software, the functions may be stored in a computer-readable medium or transmitted as one or more instructions or codes on the computer-readable medium. The computer-readable medium includes a computer storage medium and a communication medium. The communication medium includes any medium that facilitates transfer of a computer program from one location to another. The storage medium may be any available medium that can be stored and accessed by a general-purpose or special-purpose computer.

A non-transitory computer-readable storage medium is further provided by an embodiment of the present disclosure. The non-transitory computer-readable storage medium is configured to store at least one instruction, at least one program, a code set or an instruction set therein, and the at least one instruction, the at least one program, the code set or the instruction set, when loaded and executed by a processor, causes the processor to implement all or part of the steps of the above method for authority control. For example, the non-transitory computer-readable storage medium may be a ROM, a RAM, a CD-ROM, a magnetic tape, a floppy disk, an optical data storage device, or the like.

Other implementations of the present disclosure will be apparent to those skilled in the art from consideration of the specification and practice of the present disclosure. The present application is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

It should be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for authority control, wherein the method is executed by a computer device, the computer device is configured to load and execute a container, and the method comprises:
acquiring a configuration file according to a business scenario when the container is initialized, wherein the configuration file is managed outside the container, and the configuration file is configured with an authority control rule corresponding to the business scenario in the container;
validating the configuration file in the container so that a user is subjected to authority restriction in a container environment;
receiving a user instruction in the container environment;
identifying a type of the user instruction when the user instruction is an executable instruction;
acquiring script content of a script file when the type of the user instruction indicates that the user instruction is the script file, wherein the script content comprises at least one command statement; and
performing a validity check on the at least one command statement based on the configuration file.

2. The method according to claim 1, wherein before performing the validity check on the at least one command statement based on the configuration file, the method further comprises:
performing statement parsing on the script content to acquire statement content of the at least one command statement in the script content; and
performing the validity check on the at least one command statement based on the configuration file comprises:
sequentially performing the validity check on the statement content of the at least one command statement in an order of the at least one command statement based on the corresponding configuration file.

3. The method according to claim 2, further comprising:
executing a first command statement corresponding to first statement content in the statement content when the first statement content in the statement content is valid; and
stopping executing the first command statement when second statement content in the statement content is invalid, and quitting the sequentially performing the validity check on the statement content of the at least one command statement in the order of the at least one command statement based on the corresponding configuration file.

4. The method according to claim 2, further comprising:
executing the script content when the statement content of the at least one command statement is all valid.

5. The method according to claim 1, further comprising:
parsing the at least one command statement when the user instruction is the at least go command statement, to acquire statement content of the at least one command statement;
performing the validity check on the statement content of the at least one command statement based on content of the configuration file corresponding to the statement content; and
executing the at least one command statement when the statement content is valid.

6. The method according to claim 1, wherein the authority control rule is configured by an Ishell tool according to the business scenario.

7. An apparatus for authority control, wherein the apparatus is applied to a computer device, the computer device is configured to load and execute a container, and the apparatus comprises:
a first acquiring module, configured to acquire a configuration file according to a business scenario when the container is initialized, wherein the configuration file is managed outside the container, and the configuration file is configured with an authority control rule corresponding to the business scenario in the container;
a validating module, configured to validate the configuration file in the container so that a user is subjected to authority restriction in a container environment;
a receiving module, configured to receive a user instruction in the container environment;
an identifying module, configured to identify a type of the user instruction when the user instruction is an executable instruction;
a second acquiring module, configured to acquire script content of a script file when the type of the user instruction indicates that the user instruction is the script file, wherein the script content comprises at least one command statement; and
a checking module, configured to perform a validity check on the at least one command statement based on the configuration file.

8. The apparatus according to claim 7, wherein the device apparatus further comprises:
a parsing module, configured to perform statement parsing on the script content to acquire statement content of the at least one command statement in the script content before performing the validity check on the at least one command statement based on the configuration file; and
the checking module, configured to sequentially perform the validity check on the statement content of the at least one command statement in an order of the at least one command statement based on the corresponding configuration file.

9. A computer device, wherein the computer device comprises;
a processor; and
a memory storing at least one instruction, at least one program, a code set or an instruction set therein, wherein the at least one instruction, the at least one program, the code set or the instruction set, when loaded and executed by the processor, causes the processor to implement a method for authority control comprising:
acquiring a configuration file according to a business scenario when the container is initialized, wherein the configuration file is managed outside the container, and the configuration file is configured with an authority control rule corresponding to the business scenario in the container;
validating the configuration file in the container so that a user is subjected to authority restriction in a container environment;
receiving a user instruction in the container environment;
identifying a type of the user instruction when the user instruction is an executable instruction;
acquiring script content of a script file when the type of the user instruction indicates that the user instruction is the script file, wherein the script content comprises at least one command statement; and performing a validity check on the at least one command statement based on the configuration file.

10. A computer-readable storage medium storing at least one instruction, at least one program, a code set or an instruction set therein, wherein the at least one instruction, the at least one program, the code set or the instruction set, when loaded and executed by a processor, causes the processor to implement a method for authority control comprising:

acquiring a configuration file according to a business scenario when the container is initialized, wherein the configuration file is managed outside the container, and the configuration file is configured with an authority control rule corresponding to the business scenario in the container;

validating the configuration file in the container so that a user is subjected to authority restriction in a container environment;

receiving a user instruction in the container environment;

identifying a type of the user instruction when the user instruction is an executable instruction;

acquiring script content of a script file when the type of the user instruction indicates that the user instruction is the script file, wherein the script content comprises at least one command statement; and performing a validity check on the at least one command statement based on the configuration file.

* * * * *